United States Patent [19]

Erdesky

[11] Patent Number: 5,488,777
[45] Date of Patent: Feb. 6, 1996

[54] UTILITY LINE ANGLE MEASUREMENT DEVICE

[76] Inventor: William Erdesky, 502 Sutherland St., Durham, N.C. 27703

[21] Appl. No.: 309,653

[22] Filed: Sep. 21, 1994

[51] Int. Cl.⁶ .................................................. G01C 1/00
[52] U.S. Cl. .............................. 33/280; 33/285; 33/370; 33/375
[58] Field of Search ........................... 33/263, 276, 277, 33/278, 280, 285, 1 G, 1 N, 341, 343, 347, 351, 353, 370, 371, 373, 374, 375, 381, 382

[56] References Cited

U.S. PATENT DOCUMENTS

| | | | |
|---|---|---|---|
| 596,279 | 12/1897 | Potter | 33/375 |
| 974,007 | 10/1910 | Wolcott | 33/280 |
| 1,050,393 | 1/1913 | Raymond | 33/277 |
| 2,008,113 | 7/1935 | Sherritt | 33/280 |
| 2,679,105 | 5/1954 | Herrick | 33/277 |
| 2,697,234 | 12/1954 | Sturdevant | 33/280 |
| 3,382,754 | 5/1965 | Lunden | 33/263 |
| 3,858,326 | 1/1975 | Hurd | 33/277 |
| 4,245,393 | 1/1981 | Zane et al. | 33/276 |

FOREIGN PATENT DOCUMENTS

| | | | |
|---|---|---|---|
| 238371 | 1/1960 | Australia | 33/278 |
| 5091 | of 1916 | United Kingdom | 33/280 |

*Primary Examiner*—Thomas B. Will
*Attorney, Agent, or Firm*—Peter Gibson

[57] ABSTRACT

A small, portable, lightweight device enabling one person to quickly and accurately measure the angle of a utility line at a given pole consists of a protractor rotatable about a central axis divided into quadrants with a rotatable pointer mounted on the face having front and rear sights for visual alignment mounted upon a frame to which two perpendicularly oriented levels both disposed in a plane parallel to that of the protractor are also mounted. The frame has a vertical component from which a pair of positioning pins and a vertically offset plumb adjustment extend forward and are biased against a pole. The axis of one level is disposed parallel to the axis through the contact points of the two positioning pins with the pole and facilitates horizontal positioning of the pins against the pole which is maintained with manual biasing of the device against the pole. The other level guides the setting of the plumb adjustment which effects a second horizontal axis perpendicular the first and thus allows determination of a horizontal disposition of the protractor face. A baseline through the two zero markings on the protractor face is then visually aligned with one adjacent pole. The pointer is then visually aligned with the other adjacent pole and the angle subtended is read from the position of the pointer on the protractor face. Front and rear sights on the pointer and two sights upon the baseline facilitate visual alignment of both poles. The value of the angle subtended is used to calculate the lateral force upon the pole exerted by the line carried by the poles for economic sizing of the guying cable and tackle necessary to maintain the erect disposition of the poles which is necessary to maintain line operation.

15 Claims, 1 Drawing Sheet

UTILITY LINE ANGLE MEASUREMENT DEVICE

BACKGROUND OF THE INVENTION

Electrical power and communication, ie. utility lines are typically carried by a series of poles which must remain erect for transmission. A substantially uniform tension through each line effects a lateral force upon each such pole determined by the product of this tension and the sine of the angle subtended by the alignments of the line to both poles adjacent a given pole. In line transmission utilizing poles appropriate guying of each pole to counter this lateral force is a necessity to maintain the erect posture of the poles. Economic utilization of guying cable and tackle demands an accurate calculation of this lateral force which relies upon an accurate measure of this subtended angle.

Determining this subtended angle is typically accomplished by one of two methods: 1) use of a transit or theodolite; 2) triangulation with two equal legs measured with tape on the ground. The first method is generally avoided in terrain which is traversed by foot because of the weight and awkwardness of the equipment. The second method suffers from at least three drawbacks: a) two people are generally required; b) leg measurement is tedious; c) accuracy is adversely affected by changes in terrain elevation. It is thus seen that rough or sloped terrain poses a problem to either method practiced currently where utility lines carded by wood poles are a commonplace in rural areas and rough terrain including trees and brush which renders leg measurement particularly difficult is frequently traversed by such lines.

SUMMARY OF THE INVENTION

Maintenance of rural utility poles in sloped terrain is hindered by the lack of a device easily carried and operated by one person which enables quick and accurate determination of the angle subtended by the alignments of adjacent poles to a given pole. Provision of such a device comprises the object of the present invention.

An embodiment of the principles relating to the present invention is comprised of a substantially planar protractor divided into four ninety degree quadrants rotatable about a central axis having a pointer possessing visual sighting means rotatable about the same axis which is fixed perpendicular to the top of the longitudinal component of a frame further possessing a vertical member from which positioning means and a vertically offset plumb adjustment means extend forward for contact with a given utility pole. Horizontal determination means are further fixedly attached to the frame such that a horizontal reference plane is fixed parallel to the protractor face which has two opposed zero degree marks through which a baseline extends and for which visual sighting means are provided.

Operation requires manual positioning of the device on a given pole, establishment of a horizontal disposition of the protractor face facilitated by the horizontal determination means, the plumb adjustment means and the positioning means to maintain said horizontal disposition, visual alignment of the baseline with one adjacent pole facilitated by the sighting means, visual alignment of the pointer with the other adjacent pole facilitated by the sighting means and reading of the angle indicated by the pointer relative to the quadrant degree markings on the protractor face subtended by these two alignments.

A preferred embodiment of the principles relating to the present invention utilizes a pair of wood screws laterally spaced apart and extending from the forward face of a lateral frame member disposed perpendicular to both the longitudinal and vertical frame components comprising the positioning means; two fluid capsule levels disposed perpendicular to each other comprising the horizontal determination means; a wing head set screw held by a block possessing a threaded aperture fixedly attached to the bottom end of the vertical frame component comprising the plumb adjustment means; and a handle and a brace member in the frame comprise additional means facilitating positioning and biasing of the device against a given pole. A flat washer disposed in parallel with and between the pointer and the protractor face further additionally comprises bearing means. The sighting means for the baseline in the preferred embodiment is comprised of a pair of thin projections perpendicular the protractor face disposed apart from each other along the baseline and the sighting means for the pointer comprises a rear forked sight and forward single thin projection, both perpendicular the longitudinal axis of the pointer. Construction with wooden frame members as described above utilizing standard hardware is further suggested in a preferred embodiment of the principles relating to the present invention.

DETAILED DESCRIPTION OF THE INVENTION

Figure 1:
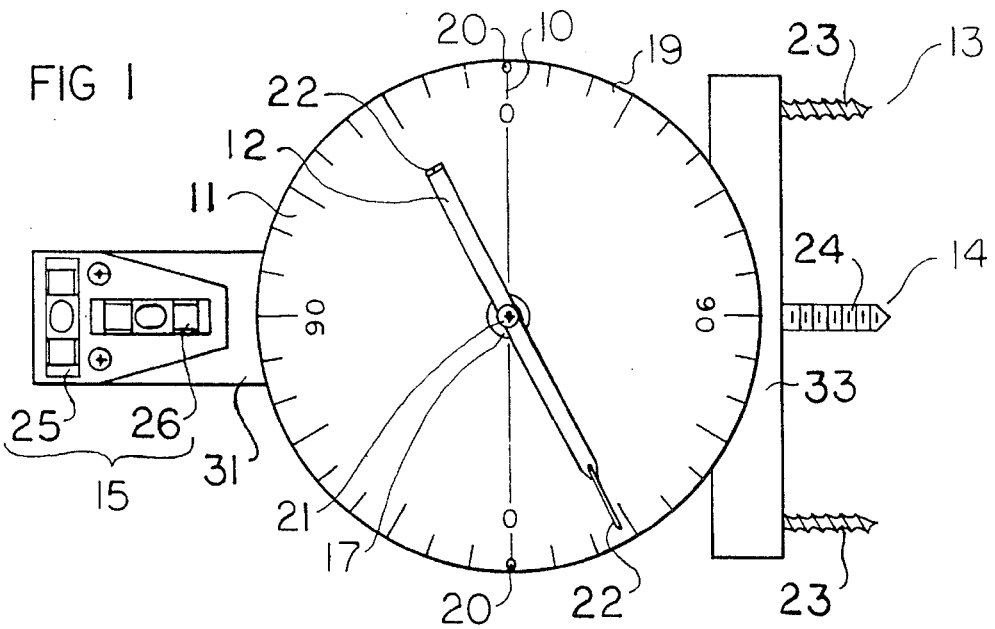
FIG. 1 is a plain elevational view taken from the top of a preferred embodiment of the principles relating to the present invention.

The principles relating to the present invention may be readily comprehended through consideration of the elements necessary to achieve the object of the same as represented in the preferred embodiment of these principles depicted in the drawings attached hereto. It is accordingly considered that in order to assure accuracy in the measurement of the angle subtended by the alignments of two adjacent poles with a given angle pole, the measurement must be made within the same horizontal plane to which the poles are substantially perpendicular. This requirement accounts for the unavoidable inaccuracies introduced by changes in terrain elevation when measured distances along the ground are utilized in the calculation of the subtended angle as is a commonplace today in maintenance of utility poles in rural areas.

Figure 2:
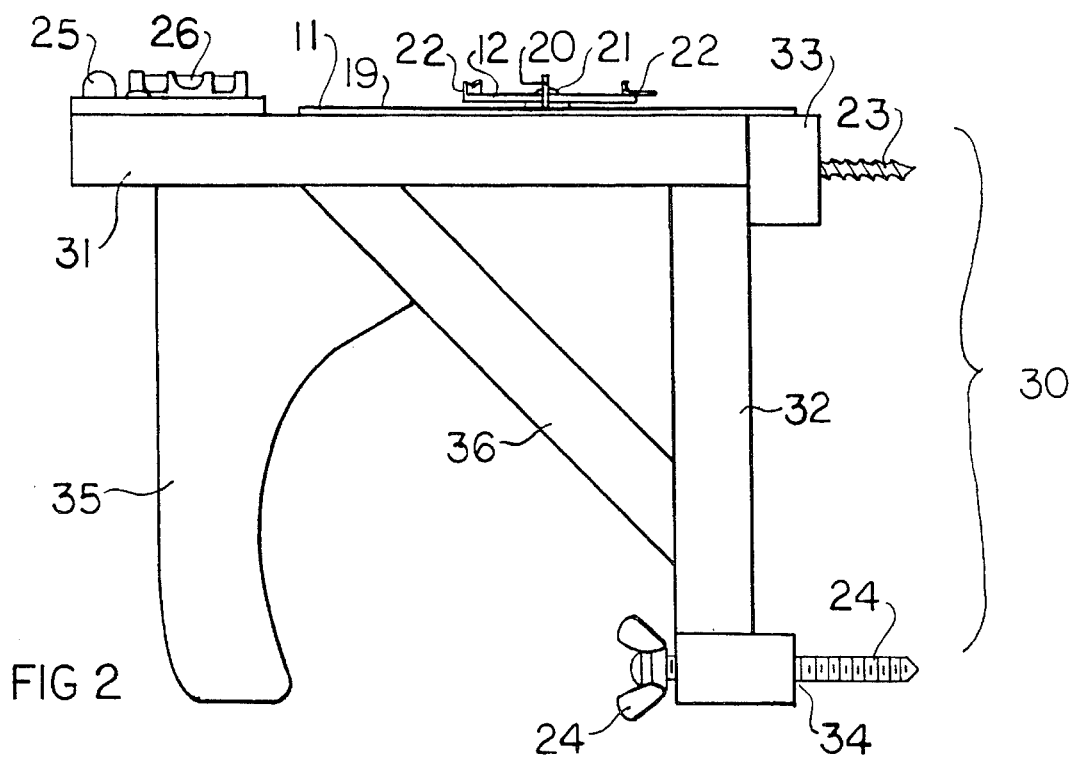
FIG. 2 is a plain elevational view taken from a side of a preferred embodiment of the principles relating to the present invention.

It is further considered that such poles are ideally aligned with the force of gravity, perpendicular to horizontal, and that horizontal is readily found by a device which is sensitive to gravity in two degrees of freedom, herein known as horizontal determination means. The horizontal determination means 15 utilized in the preferred embodiment depicted in FIGS. 1–2 is comprised of a first level 25 and a second level 26, both of conventional fluid capsule type, perpendicularly disposed to one another with coplanar horizontal reference planes wherein a trapped gas bubble is read between parallel marks for level along the axis of the capsule. Alternatively, any functional equivalent in determining a horizontal orientation sensitive to gravity in two degrees of freedom, such as a spherical compass mounted on gimbals possessing appropriate horizontal indication markings, may be substituted without deviation from adherence to the principles relating to the present invention.

Possessing then the horizontal determination means 15, it is necessary to dispose the instrument providing angular measurement horizontally. This requires a rigid disposition of the plane of the protractor face 19 with respect to the horizontal determination means 15 by means of the frame 30. In the present case, the first level 25 and the second level 26 and the protractor central axis 21 are each rigidly attached to the frame 30 such that the face 19 of the protractor 11, clearly seen in FIG. 1, is parallel to the reference plane or fixed horizontal indicators of each level. The protractor 11 is rotatable about the central axis 21 but the plane of rotation is parallel to the reference plane of the horizontal determination means 15 so that when horizontal is found therewith, the protractor face 19 is also horizontal.

In operation of the preferred embodiment of the principles relating to the present invention depicted in FIGS. 1–2, the device is first positioned, butting the forward face of the lateral frame member 33 against a utility pole, manually adjusting the axis of contact made by the two positioning pins 23 to level as determined by the first level 25 which is parallel to the axis of contact. The positioning pins 23 are then biased against the pole by pressure exerted upon the handle 35 through the brace 36 and the rest of the frame 30 thus maintaining this one degree of freedom in horizontal and providing a level axis about which the second degree of freedom may be brought to level with an adjustment of plumb effected by manipulation of the set screw 24 in contact with the pole and determined with a reading of the second level 26.

Having thus brought the protractor face 19 into a horizontal disposition as determined by the horizontal determination means 15, the baseline 10 through both zero degree markings is visually aligned with one adjacent pole. Two baseline sights 20 each comprised, in the example clearly depicted in FIGS. 1–2, of a simple thin projection perpendicular to the face of the protractor 11 facilitate this visual alignment. A hollow tube lying flush with the face of the protractor 11 directly above the baseline 10 serves as another example of a baseline sight 20 which is functionally equivalent in regard to the principles relating to the present invention.

The pointer 12 is next aligned with the other adjacent pole by visual sighting facilitated by the pointer sights 22 not dissimilar to the "open irons" standard sights on a firearm, wherein the front sight comprises a single thin projection which is sighted through the forked rear sight. Other sighting means such as the hollow tube mentioned above may readily be substituted for this "open irons" style without deviation from adherence to the principles relating to the present invention. With the baseline 10 horizontally aligned with one adjacent pole and the pointer 12 horizontally aligned with the other adjacent pole, the angle subtended by the line carried by the three poles at the given angle pole is readily read from the position of the pointer 12 relative to the protractor 11. The pointer 12 is held parallel to the protractor face 19 by bearing means allowing rotation comprises of a plain flat washer 17 in the preferred embodiment.

Temporary attachment to a given pole may be effected by the positioning means 13 such as the positioning screws 23 depicted in FIGS. 1–2 or by alternate means such as a strap of sufficient length to encircle a utility pole and it is considered that one practiced in the an can readily devise other mechanisms such as one utilizing a cam which could easily substitute for the set screw 24 and threaded aperture 34 which comprise the plumb adjustment means 14 in the preferred embodiment. Another alternative embodiment of the plumb adjustment means which facilitates very quick operation and is highly recommended for this reason is utilization of a spring loaded pin. In this embodiment, a spring concentric and exterior to the pin biases the pin to full extension forward of the vertical component 31. Positioning of the device depresses the pin and a locking mechanism, perhaps a set screw laterally disposed to the pin shaft, facilitates fixing of the plumb adjustment at the desired level condition.

In regard to the principles relating to the present invention, the plumb adjustment means comprises a means of adjusting the disposition of the device when positioned on a pole in the plane perpendicular to the contact axis effected by the positioning means. It is not necessary that the device be held by the positioning means 13 but that level in the first degree of freedom parallel to the contact axis between the device and the pole effected by the positioning means 13 be maintained during plumb adjustment and that the plumb adjustment means 14 be vertically offset from this contact axis.

The device depicted in FIGS. 1–2 is further constructed with a frame 30 consisting of five pieces rigidly fixedly attached to one another: a longitudinal member 31, a vertical member 32, a lateral member 33, a block possessing a threaded aperture 34 for the set screw 24, a handle 35 and a brace 36. Only two of these frame elements are necessary to construct a device which can operate in the manner described above and hence fulfill the principles relating to the present invention. The longitudinal member 31 rigidly disposed perpendicular to the vertical member 32 comprises the essential structure required for a functional device.

A rigid relation is required between the horizontal determination means 15 reference level and both the protractor 11 and associated pointer 12 and the necessary vertical structure between the positioning means 13 and the plumb adjustment means 14. This relation is provided by the rigid, perpendicular disposition of the longitudinal member 31 and the vertical member 32, which may of course be effected with a single piece which may further be tapped for utilization of a set screw 24 without the separate block possessing a threaded aperture 34 as depicted. The handle 35 furthermore, is a convenience in operation and comprises a comfortable hand grip fixed in relation to the frame 30 particularly in regard to biasing the device against a pole in positioning. The brace 36 similarly possesses obvious utility in a wood construction such as that illustrated. However, it is equally obvious that a frame 30 constructed from a single cast piece of aluminum alloy, for example, would also provide an eminently sensible frame in accordance with the principles relating to the present invention.

It is lastly considered that the details of construction are within the ability of one practiced in the art relating to the present invention and it is emphasized that the foregoing is intended as an illustration of the principles relating to the present invention to facilitate a thorough understanding of the same and is in no manner restrictive of the extent of the intellectual property or of the rights and privileges secured by Letters Patent for the same for which I hereby claim:

1. An angle measurement device intended to enable quick, accurate measurement by one person of the angle subtended by a utility line at a given utility pole, said device comprising:

a frame, a protractor, a pointer, horizontal determination means, positioning means and plumb adjustment means;

said frame possessing both a longitudinal and a vertical component, said protractor possessing a central axis and a face divided into four ninety degree quadrants possessing two opposed zero degree markings through which a baseline extends, said pointer and said protractor each being rotatable about said central axis fixed perpendicular to said longitudinal frame component such that said protractor face and said pointer are confined to rotation within parallel planes proximate each other and fixed in relation to said frame;

said horizontal determination means comprising a device sensitive to gravity in two degrees of freedom further possessing a horizontal reference plane fixed parallel to said plane of rotation of said protractor face by fixed attachment to said frame;

said positioning means possessing a component extending forward of said vertical frame component which, brought in contact with said given pole in operation, effects a contact axis and facilitates maintenance of the disposition of said axis with respect to said pole;

said plumb adjustment means possessing a component extending forward of said vertical frame component, vertically offset from said contact axis which, in contact with said given pole, enables manual regulation of the orientation of the device with respect to the plane perpendicular to said contact axis;

said protractor face baseline and said pointer each possessing visual sighting means enabling visual alignment of each with a vertical pole adjacent said given pole;

said horizontal determination means in combination with said positioning means enabling level orientation of said contact axis and maintenance of said level orientation, said horizontal determination means in combination with said plumb adjustment means enabling level orientation of the device in a plane perpendicular to said contact axis and maintenance of said level orientation, the effecting and maintenance of said level orientations of both said contact axis and said plane perpendicular to said contact axis thereby effecting a horizontal disposition of said protractor face and said pointer, said visual sighting means facilitating the visual alignment of said baseline with one adjacent pole and visual alignment of said pointer with the other pole adjacent to said given pole against which said device is positioned thereby yields by reading of the degree markings indicated by said pointer relative said protractor face a measurement of the angle subtended by the two alignments of the given pole with the two adjacent poles within a horizontal plane and hence yields an accurate measurement of the angle subtended by said line at said given utility pole quickly and readily obtained by one person.

2. The device of claim 1 wherein said horizontal determination means are comprised of two perpendicularly disposed conventional fluid capsule level indicators wherein level is read from the position of a trapped gas bubble between two markings, each possessing a horizontal reference plane fixed parallel to said protractor face by rigid attachment to said frame.

3. The device of claim 1 wherein said visual sighting means includes baseline sights comprised of a pair of thin projections extending perpendicularly upward from said protractor face, spaced apart from one another along said baseline.

4. The device of claim 1 wherein said visual sighting means includes pointer sights comprised of a forked rear sight and a thin projection front sight, both extending perpendicularly upward from said pointer and spaced apart from each other.

5. The device of claim 1 further including bearing means facilitating the maintenance of the rotation of said pointer about said central axis parallel to said protractor face.

6. The device of claim 5 wherein said bearing means is comprises of a conventional flat washer disposed parallel to and between said protractor face and said pointer.

7. The device of claim 1 further possessing a handle rigidly attached to said frame depending in a substantially vertical position spaced apart from said vertical component facilitating manual positioning of said device against a utility pole.

8. The device of claim 7 further possessing a brace member rigidly attached to said frame providing structural strength to said frame in biasing of said device against a utility pole during manual positioning.

9. The device of claim 1 further possessing a lateral member rigidly attached to said frame disposed perpendicularly to both said longitudinal frame component and said vertical frame component.

10. The device of claim 9 wherein said positioning means are comprised of a pair of rigid pins fixedly attached to said lateral member and extending forward of said vertical frame component terminating in sharp ends.

11. The device of claim 10 wherein each said rigid pin is comprised of a conventional wood screw extending through said lateral member.

12. The device of claim 1 wherein said plumb adjustment means is comprised of a set screw rotatably held by a threaded aperture in rigid disposition with respect to said frame substantially perpendicular to and with a blunt point extending forward of said vertical frame component.

13. The device of claim 12 wherein said set screw further possesses a wing type head, opposite said blunt point, facilitating manual operation of said plumb adjustment means.

14. The device of claim 13 wherein said threaded aperture is provided in a separate block rigidly fixed to said frame at the bottom of said vertical frame component.

15. The device of claim 1 wherein said frame is constructed from wooden components.

* * * * *